US006456414B1

(12) United States Patent
Dahlke et al.

(10) Patent No.: US 6,456,414 B1

(45) Date of Patent: Sep. 24, 2002

(54) SEQUENTIAL COLOR SCANNER

(75) Inventors: Weldon J. Dahlke, San Diego; Markham E. Lasher, La Jolla, both of CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/639,127

(22) Filed: Aug. 15, 2000

(51) Int. Cl.[7] .............................................. G02B 26/08

(52) U.S. Cl. ....................... 359/201; 359/202; 359/204; 347/232; 348/266; 348/268

(58) Field of Search ................................ 359/201–202, 359/204; 358/505, 518; 347/232, 235, 238; 348/196, 203, 210, 266, 268, 269, 750, 754, 755, 757

(56) References Cited

U.S. PATENT DOCUMENTS

| | | | |
|---|---|---|---|
| 4,821,113 | A | 4/1989 | McQuade et al. |
| 4,992,858 | A | 2/1991 | Kobayashi |
| 5,251,055 | A | 10/1993 | Koide |
| 5,381,224 | A | 1/1995 | Dixon et al. |
| 5,465,174 | A | 11/1995 | Sprotbery |
| 5,506,597 | A | 4/1996 | Thompson et al. |
| 5,572,375 | A | 11/1996 | Crabtree, IV |
| 5,600,487 | A | 2/1997 | Kiyomoto et al. |

*Primary Examiner*—James Phan
(74) *Attorney, Agent, or Firm*—Celia C. Dunham; James A. Ward; Peter A. Lipovsky

(57) ABSTRACT

A sequential color scanner capable of generating both two and three dimensional moving color images has only one x- and y-deflection channel. The system includes first, second, and third optical signal generators for generating a first, second, and third optical signal, respectively. Each optical signal is characterized one of the three primary colors. The first, second, and third light signals are blue, green, and red, although not necessarily in that order. The first optical signal is generated along an optical axis. First and second beam combiners direct the second and third optical signals, respectively, along the optical axis. A first optical deflector deflects the optical signals in a first plane, and a second optical deflector for deflecting the optical signals in a second plane that is orthogonal to the first plane. First, second, and third modulators modulate the intensity of the first, second, and third optical signals, respectfully. A controller supervises each of the first, second, and third modulators so that the optical signals are generated in a pulsed, repeating sequence in accordance with an index that is counted by an index counter implemented in a controller. The controller also supervises modulation of the first and second optical deflectors so that the light signals are directed to predetermined coordinates. A time delay $\tau$ is introduced between optical signals for enhancing the sharpness of the image by assuring that the optical deflectors modulate only one light signal at a time.

21 Claims, 13 Drawing Sheets

MODULATOR SELECTION SCHEMATIC

| FIG. 5A | FIG. 5B |
|---|---|

| FIG. 6A | FIG. 6B |
|---|---|

| FIG. 7A | FIG. 7B |
|---|---|

SEQUENTIAL COLOR SCANNER

BACKGROUND OF THE INVENTION

The present invention generally relates to the field of optical scanning, and more particularly to an optical scanning system which generates red, blue, and green light pulses in a repetitive sequence to create two and three dimensional images.

U.S. Pat. No. 5,854,613, entitled LASER BASED 3D VOLUMETRIC DISPLAY SYSTEM, describes a system for generating three dimensional images. The system employs red, green, and blue lasers. Each laser generates a laser beam that is subdivided into multiple laser beams that are directed through a separate deflection channel along its own optical axis. Each deflection channel includes both x- and y-acousto-optic beam deflectors or modulators for directing the subdivided laser beams to appropriate coordinates of the surface of a rotating reflective structure. However, multiple deflection channels make it difficult to maintain good color convergence over an extended period of time. Moreover, separate deflection channels increase both the cost and bulk of such systems. Therefore, a need exists for a color scanner system that may be used to create two and three dimensional color images that uses only one deflection channel.

SUMMARY OF THE INVENTION

The present invention provides a sequential color scanner capable of generating both two and three dimensional, moving color images with only one x- and y-deflection channel. The system includes first, second, and third optical signal generators for generating a first, second, and third optical signal, respectively. Each optical signal is characterized by one of the three primary colors, blue, green, and red, although not necessarily in that order. The first optical signal is generated along an optical axis. First and second beam combiners direct the second and third optical signals, respectively, along the optical axis. A first optical deflector deflects the optical signals in a first plane, and a second optical deflector for deflecting the optical signals in a second plane that is orthogonal to the first plane. First, second, and third modulators modulate the intensity of the first, second, and third optical signals, respectfully, under the supervision of a controller so that the optical signals are generated in a pulsed, interlaced, and repeating sequence in accordance with an index counted by an index counter implemented in the controller. The controller also supervises modulation of the first and second optical deflectors for directing the light signals to predetermined coordinates, and generates a clock signal having a periodicity P. The repeating sequence includes a first pulse of the first optical signal having a duration of (wP-τ), a second pulse of the second optical signal having a duration of (yP-τ), and a third pulse of the third optical signal having a duration of (zP-τ), where w, y, and z are positive integers, and r represents a time delay. The time delay τ between optical signals is used to enhance the sharpness of the image by assuring that the optical deflectors modulate only one light signal at a time.

An important advantage of the invention is that it only requires one optical channel for deflecting each of the red, green, and blue pulsed optical signals. Another important advantage of the invention is that if the intensities of the first, second, and third light signals generated by the light signal generators are not equal, the invention may be configured to make the durations of the pulsed light signals different so that the light signals reflected off a reflecting structure appear to be equal.

These and other advantages of the invention will become more apparent upon review of the accompanying drawings and specification, including the claims.

BRIEF DESCRIPTION OF THE DRAWINGS

Throughout the several view, like elements are referenced using like references.

DESCRIPTION OF THE PREFERRED EMBODIMENTS

Figure 1A:
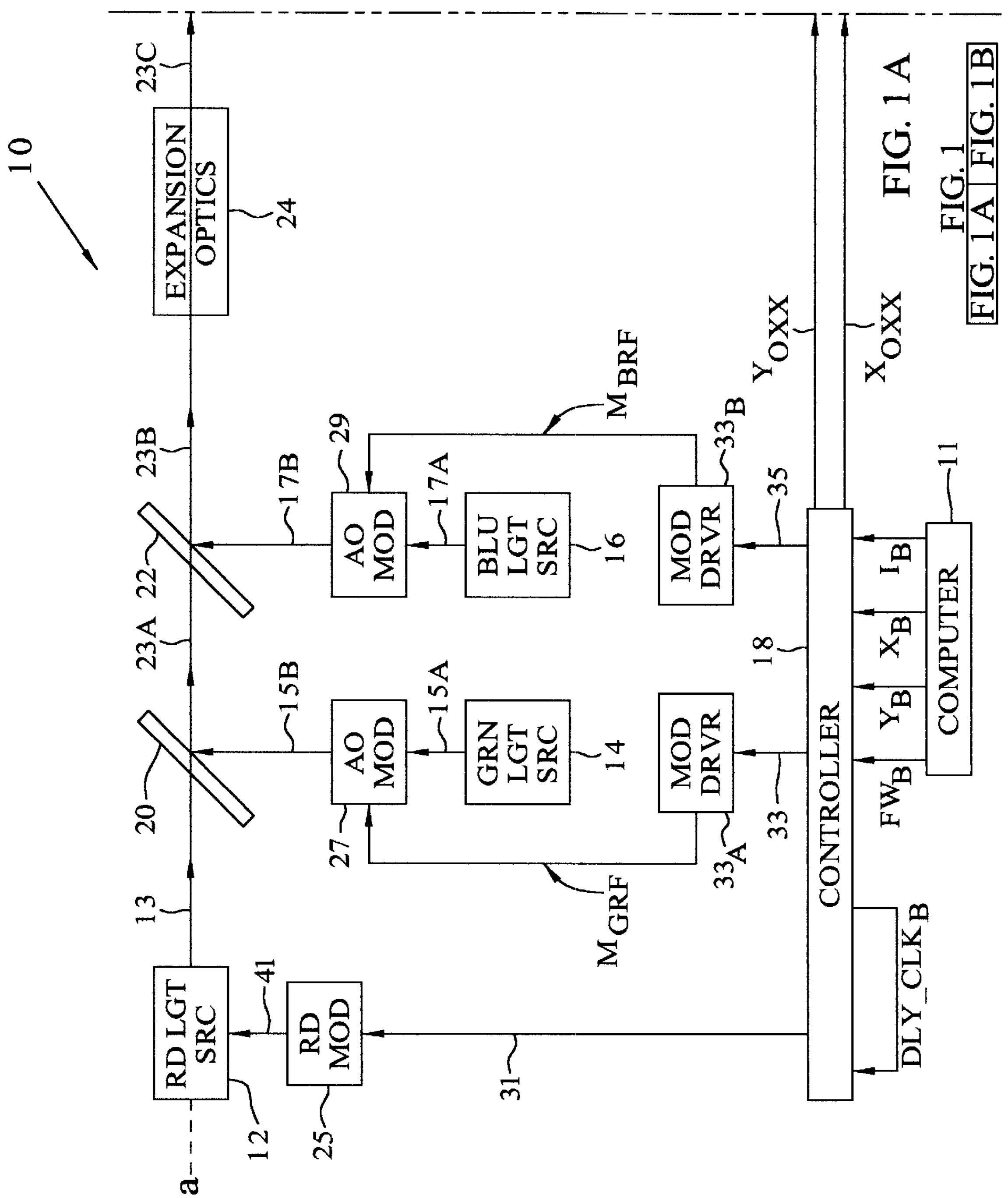
FIG. 1 illustrates a block diagram of a sequential color scanner embodying various features of present invention.
Figure 1B:
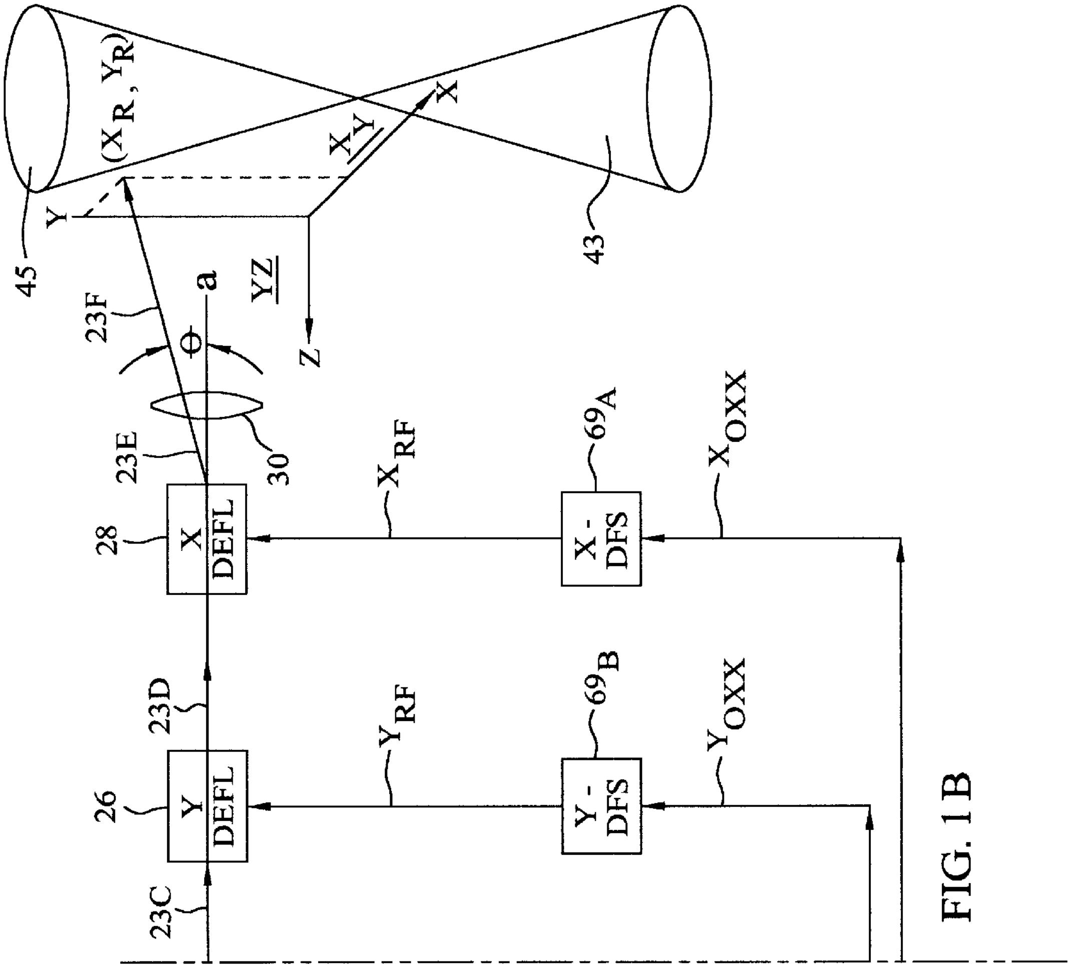

The present invention is an optical scanning system that may be employed to create both two and three dimensional, moving color images. Referring to FIG. 1, optical scanning system 10 includes a red, green, and blue optical signal generators 12, 14, and 16, respectively, controller 18, wavelength selective mirrors 20 and 22, expansion optics 24, Y-deflector 26, X-deflector 28, lens 30, red light source modulator 25, acousto-optic modulators 27 and 29, acousto-optic radio frequency (RF) modulator drivers 33A and 33B, X- and Y-digital frequency synthesizers $\mathbf{69}_A$ and $\mathbf{69}_B$, respectively, and computer 11. Optical signal generators 12, 14, and 16 generate a pulsed red, and continuous green and blue optical signals 13, 15A, and 17A, respectively. Red optical signal 13 propagates through partially reflective mirrors 20 and 22 along optical axis a—a. Controller 18 provides control signals 31, 33, and 35 to red light source modulator 25 and acousto-optic RF modulators $\mathbf{33}_A$ and $\mathbf{33}_B$, respectively.

Control signal 31 supervises red light source modulator 25 which generates a control signal 41 that causes red light source 12 to generate a "blanked," or pulsed red light output signal 13. Red modulator 25 may be implemented, for example, as a Wavelength Electronics, Inc. red laser diode driver, Model LDD200-1P (0–200 Ma). Controller 18 generates control signals 33 and 35 that supervise acousto-optic RF modulator drivers $\mathbf{33}_A$ and $\mathbf{33}_B$, respectively. Acousto-optic RF modulator driver $\mathbf{33}_A$ generates an RF output signal MGRF that controls acousto-optic modulator 27. Similarly, acousto-optic RF modulator driver $\mathbf{33}_B$ generates an RF output signal $M_{BRF}$ that controls acousto-optic modulator 29. Under the supervision of RF signal $M_{GRF}$, acousto-optic modulator 27 transforms continuous green optical signal 15A into a pulsed and intensity modulated green optical signal 15B. Under the supervision of RF signal $M_{BRF}$, acousto-optic modulator 29 transforms continuous blue optical signal 17A into a pulsed and intensity modulated blue optical signal 17B.

The pulsed optical signals are interlaced to provide a pulse train sequence of optical signals 13, 15B, and 17B, although not necessarily in that order, such that an optical signal pulse of one color only is presented at any one time along axis a—a. Also, a time delay τ is introduced between the pulses to increase image contrast. By way of example, green and blue acousto-optic modulators 27 and 29 preferably operate at 532 and 465 nm, respectively.

Pulsed green optical signal 15B is reflected by wavelength selective mirror 20 so as to propagate along optical axis a—a. Either red optical signal 13 after passing through mirror 20, or green optical signal 15B after being reflected by mirror 20 is referenced as optical signal 23A. Pulsed blue optical signal 17B is reflected by wavelength selective mirror 22 so as to propagate along optical axis a—a. Either optical signal 23A or blue optical signal 17B after being reflected by mirror 22 is referenced as optical signal 23B. Signals $M_{GRF}$ and $M_{BRF}$ are radio frequency signals. Image smearing would result if two or more excitation frequencies simultaneously propagated though the acousto-optic modulators 27 or 29. Smearing of images generated by system 10 is avoided by inserting a blanking time delay τ between light pulses of different colors, as described more fully below.

Still referring to FIG. 1, expansion optical element 24 expands the width of optical signal 23B and transforms it into optical signal 23C. Controller 18 further generates output signals $X_{0xx}$ and $Y_{0xx}$ that supervise x- and y-digital frequency synthesizers (DFS) $\mathbf{69}_A$ and $\mathbf{69}_B$ respectively, where xx represents bit numbers. In response to receiving signals $X_{0xx}$ and $Y_{0xx}$, DFSs $\mathbf{69}_A$ and $\mathbf{69}_B$ generate RF output signals $X_{RF}$ and $Y_{RF}$, respectively. Signal $X_{RF}$ controls the amount by which X-deflector 28 deflects optical signal 23D. Signal $Y_{RF}$ controls the amount by which y-deflector 26 deflects optical signal 23C. The degree to which the X- and Y-deflectors 28 and 26 deflect optical signals 23D and 23C is functionally related to the frequency of signals $X_{RF}$ and $Y_{RF}$, respectively. Optical signal 23C may be deflected in the y-direction by Y-deflector 26 in a plane such as reference plane Y-Z, whereas optical signal 23D may be deflected in the x-direction by X-deflector 28 in the X-Z plane which is orthogonal to reference plane X-Y. By way of example, Y- and X-deflectors 26 and 28 each may be implemented as a tellurium dioxide acousto-optic deflector that operates at wavelengths in the range of about 440 to 655 nm.

X-deflector 28 transforms optical signal 23D into optical signal 23E. Next, optical signal 23 is focused by lens 30 and transformed into a focused optical signal 23F that is directed to specific coordinates of a reflective surface 43 of optically reflective structure 45. Surface 43 may be fixed or oscillating, therefore providing system 10 with the capability of creating either two or three dimensional moving color images by scanning optical signal 23F. An example of an oscillating surface suitable for use in the present invention is the rotating display surface described in commonly assigned U.S. Pat. No. 5,854,613, incorporated herein by reference. Optical signal 23F is directed to x- and y-coordinates ($X_R$, $Y_R$) of a Cartesian coordinate system. Idealized x- and y-coordinates are represented by signals $X_B$ and $Y_B$ that are generated by computer 11 and provided to controller 18. Controller 18 transforms signals $X_B$ and $Y_B$ into control signals $X_{0xx}$ and $Y_{0xx}$ that are used to direct optical signal 23F to the appropriate pixel locations in plane X-Y, at for example, to exemplary coordinate ($X_R$, $Y_R$).

Figure 4:
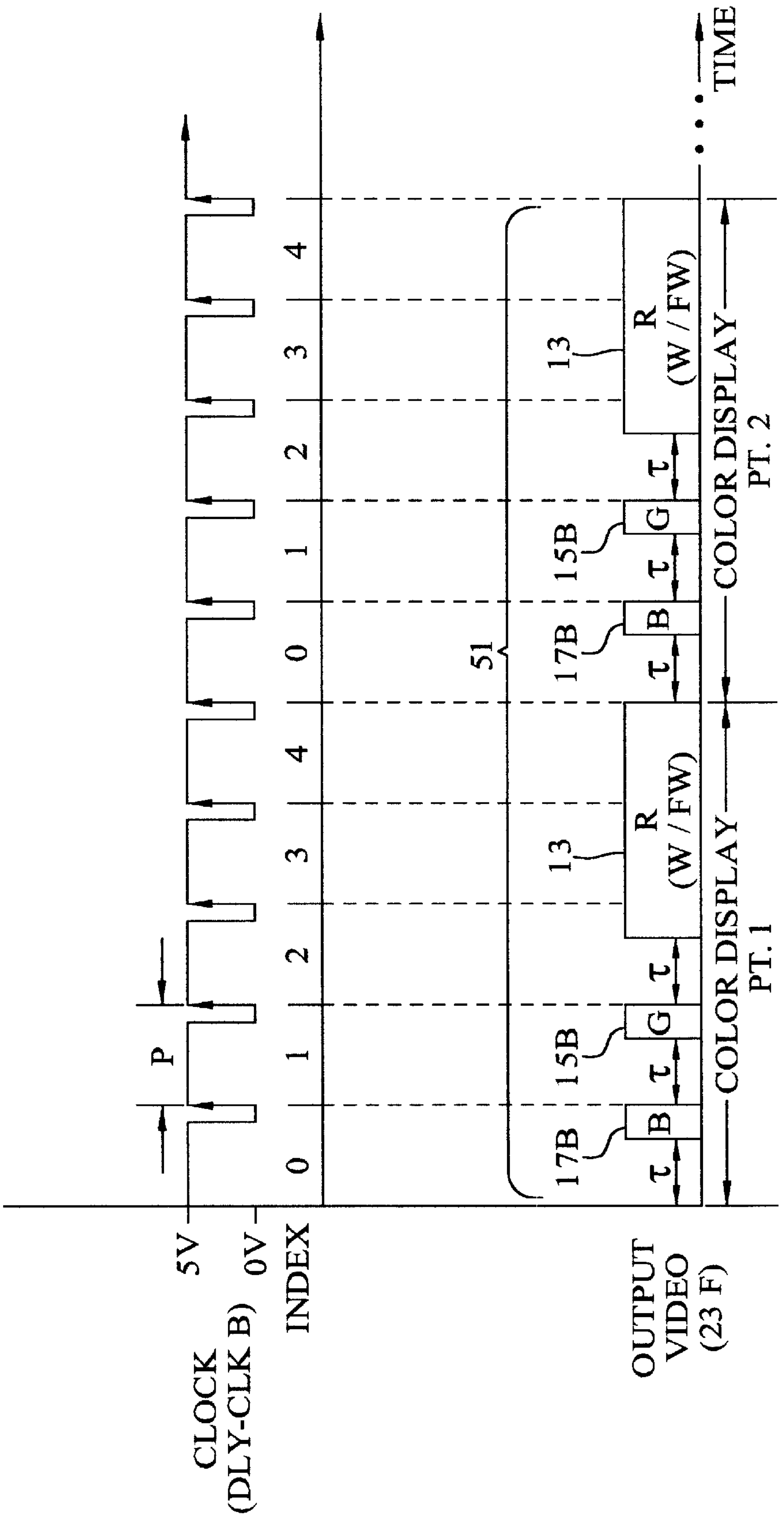
FIG. 4 is a diagram illustrating the timing sequence of blue, green, and red light signal pulses emitted by system 10 of FIG. 1 in relation to a clock signal and index counter.

A diagram illustrating an example of the repetitive sequence 51 of the pulsed color light signals 13, 15B, and 17B is shown in FIG. 4. The sequence 51 of light pulse signals directed through lens 30, by way of example, is, a blue pulse 17B, green pulse 15B, and red pulse 13, and then the sequence repeats. In between each light pulse there is a time delay τ. The blue pulses each correspond with an index count of "0" after an initial time delay τ. The green pulses each correspond with an index count of "1" after an initial time delay τ. The red pulses each correspond with index count 2–4 after an initial time delay τ. Light pulses of all colors are timed to end on the rising edge of clock signal Dly_CLKB having a periodicity of P. However, red optical signal 13 remains "on" while signal FW is a logic high. Signal FW is a logic signal generated by computer 11 that is transformed into signal FW by memory out register 49, as shown in FIG. 2.

In the preferred embodiment, blue light source 16 and green light source 14 may be implemented as lasers, and red light source 12 may be implemented as a laser diode. However, the intensity of red light emitted from the laser diode is generally less than that of either blue or green light emitted from lasers. In fact, in one example of the invention, the intensity of the output of red laser diode 12 is about one third as intense as the outputs of the green and blue lasers 14 and 16. In order to effectively normalize the perceived intensities of light signals 23F, whether red, green, or blue, the sequence of light pulses includes one long red light pulse 13 having a width that may for example, be three clock periods less a time delay (3P-τ) and shorter green and blue pulses 15B and 17B, respectively, that are each one clock period wide less the time delay (P-τ), where P represents the period of the clock pulses of clock signal clock signal Dly_CLKB generated by controller 18, and τ represents the time delay.

Figure 2A:
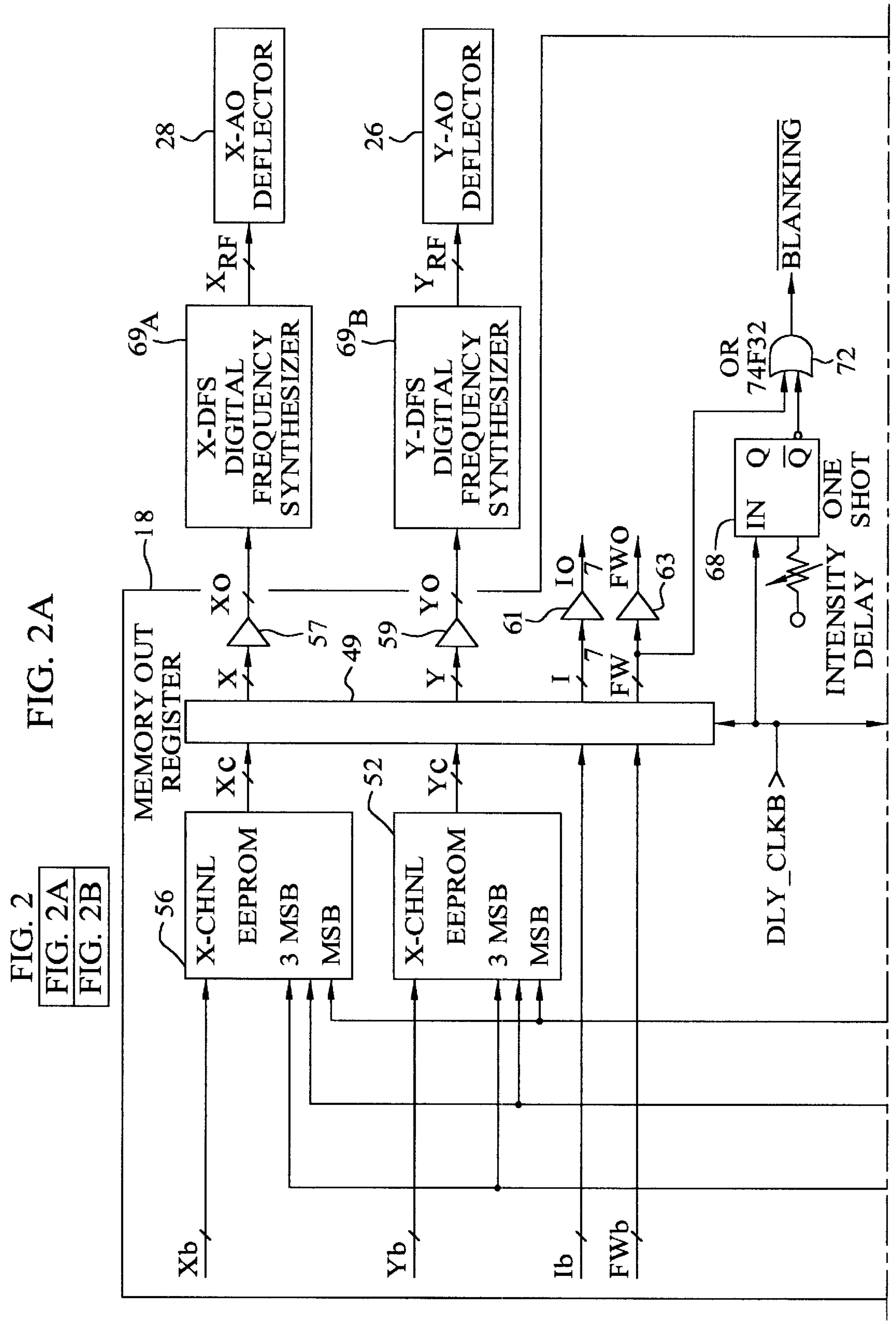
FIG. 2 is a block diagram of the controller shown in FIG. 1.
Figure 2B:
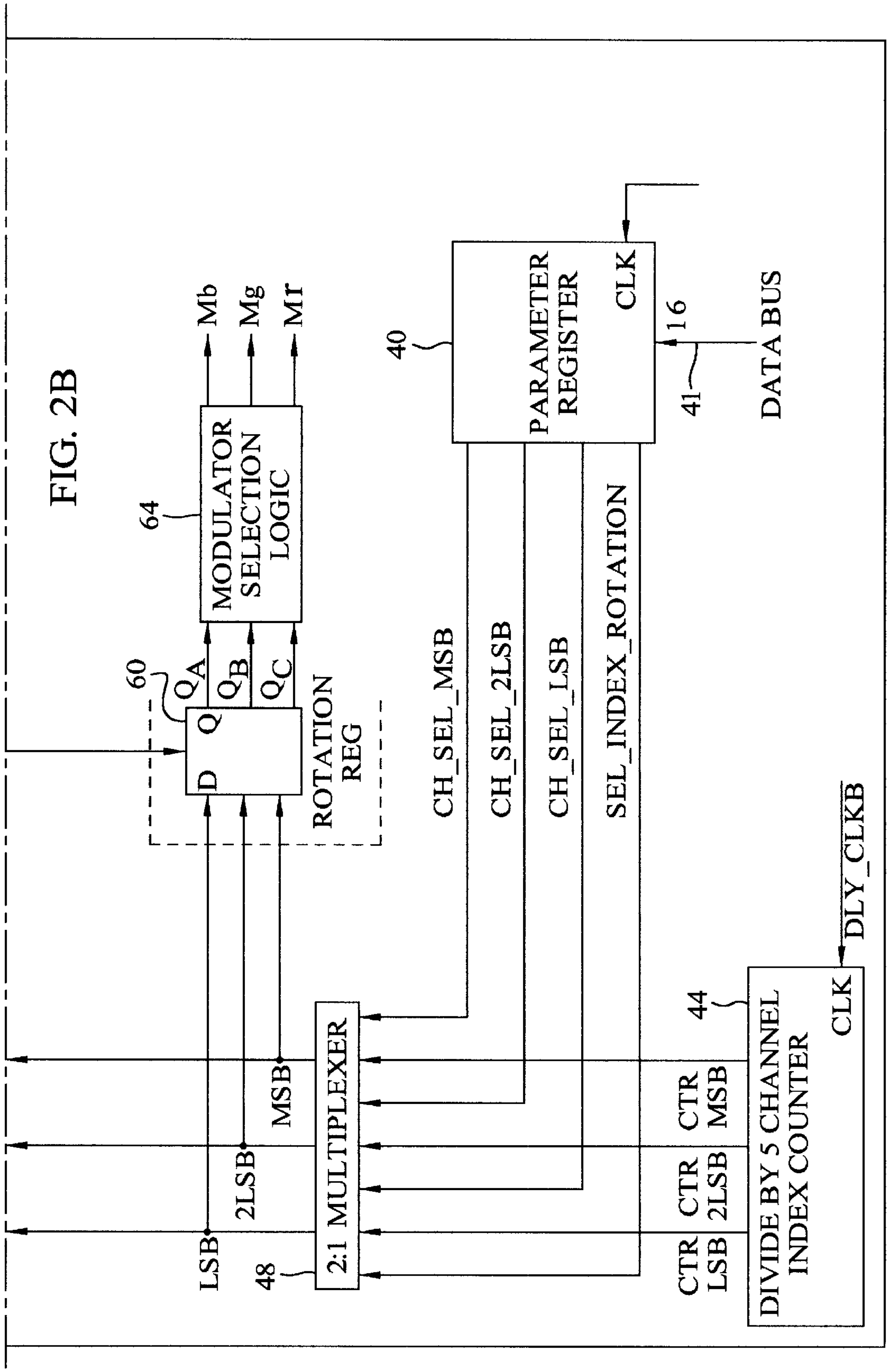

With reference to FIG. 2, controller 18 may be implemented to include a parameter register 40, index counter 44, multiplexer 48, memory storage devices, such as EEProms 52 and 56, flip-flop 60, and modulator selection logic device 64. In the operation of controller 18, idealized X- and Y-coordinates, to which each light signal 23F is to be directed, are provided as address signals X and Y to EEProms 52 and 56. Idealized coordinates refer to the actual coordinates in a Cartesian coordinate systems to which light signal 23F is desired to be directed. Red, blue, and green light all refract differently as they pass through refractive media, such as expansion optics 24, X- and Y-deflectors 26 and 28, respectively, and lens 30. Therefore, such individual refractive behavior must be accounted for if the pulsed light signals 23F are to be directed accurately. EEProms 52 and 56 store deflector driver data that corrects for the refractive effects of X- and Y-deflectors 26 and 28, and lens 30 that may affect light signals 23C, 23D, 23E, and 23F.

EEProms 52 and 56 store x- and y-coordinate correction data (collectively referenced as coordinate correction data). In order for the x- and y-deflectors 28 and 26 to direct light signals 23C and 23D to the desired coordinates, it is necessary to incorporate coordinate correction factors into deflection control signals $X_{0xx}$, and $Y_{0xx}$ respectively, that are output by EEProms 52 and 56. The deflection control data is defined to work in conjunction with the specific Y- and X-deflectors 26 and 28 incorporated into system 10. Coordinate correction data for each separate color is necessary because light signals 23C and 23D each include, albeit one at a time, red, green, and blue optical pulses 13, 15B, and 17B that have different refractive characteristics because of their different wavelengths. EEProms 52 and 56 store deflection control data that are output as signals $X_{0xx}$ and $Y_{0xx}$. Each defined pixel in plane AY has correction factors for each of the red, green, and blue light signals.

Coordinate correction data is determined in accordance with the following relation: $\theta_c=\lambda f/V_a$, where θ represents the corrected deflection angle in radians, subscript C represents a particular color, such as red, green, or blue, $\lambda$ represents the wavelength of the optical signal in meters, $f$ represents the radio frequency of signal $X_{RF}$ or $Y_{RF}$, and $V_a$ represents the acoustic velocity ($0.651\times10^3$ m/s in $TeO_2$, the material comprising X- and Y-deflectors 28 and 26. Thus, $\theta_{Red}=975.42\times10^{-10}$ s$\times f$, where red light source 12 generates an optical output signal 13 having a wavelength of 635 nm; $\theta_{Green}=817.20\times10^{-10}$ s$\times f$, where green light source 14 generates an optical output signal 15A having a wavelength of 532 nm; and $\theta_{Blue}=714.29\times10^{-10}$ s$\times f$, where blue light source 16 generates an optical output signal 17A having a wavelength of 465 nm.

An example of the way coordinate correction factors are determined is provided as follows: Assume that the specific examples of the y- and x-acousto-optic deflectors 26 and 28 identified herein each have an RF range from 75 MHZ to a maximum of 125 MHZ for a bandwidth of 50 MHZ. The deflection ratio $\theta_{blue}$ $2/\theta_{Red}$=0.7323. Therefore, the angular deflection of the red optical pulses 23C must be reduced by a factor of 0.7323 compared to the angular deflection of blue optical pulse 23C so that the red and blue optical pulses would meet at the same pixel coordinates, as for example, $(X_R,Y_R)$ in the XY plane. The maximum frequency to be provided as either signal $X_{RF}$ or $Y_{RF}$ to X- and Y-deflectors 28 and 26, respectively, to deflect red light pulses 23C to the same coordinates that would be illuminated by the blue light pulses 23C at the maximum desired deflection, is equal to the product of the maximum operating frequency of x- and y-deflectors 28 and 26 and the ratio $\theta_{Blue}/\theta_{Red}$ (0.7323), i.e., 125 MHz×0.7323=91.54 MHZ, in order to obtain maximum deflection of the red optical pulses.

In another example, the deflection ratio $\theta_{Blue}/\theta_{Green}$= 0.874. Therefore, the angular deflection of the green optical pulse 15A must be reduced by a factor of 0.874 compared to the angular deflection of blue optical pulses 23C so that the green optical pulses 23C and blue optical pulses 23C would meet at the same pixel coordinates such as $(X_R,Y_R)$. The maximum frequency to be provided as either signal $X_{RF}$ or $Y_{RF}$ to X- and Y-deflectors 28 and 26, respectively, to deflect the green pulses to the same coordinates at maximum deflection as would the blue pulses be directed, is equal to the product of the maximum blue frequency and $\theta_{Blue}/\theta_{Green}$ (0.874), i.e., 125 Mhz×0.874=109.25 MHZ in order to obtain maximum deflection of the green optical pulses.

Based on the example, above, one would determine the minimum frequencies of $X_{RF}$ and $Y_{RF}$ to obtain the minimum deflections of the red, blue, and green optical pulses in a manner similar to that used to determine the maximum deflection for each of the primary colors. However, one would substitute the minimum operating frequency (75 MHZ) of the x- and y-deflectors 28 and 26 in place of the maximum operating frequency for the deflectors in the appropriate formulas above. The minimum and maximum operating frequencies for signals XRF and YRF for each of the red, blue, and green pulses for scaling the deflections of the different colored optical pulses are summarized in TABLE 1, below.

TABLE 1

Frequencies of Signals $X_{RF}$ and $Y_{RF}$ For Controlling X- and Y-Deflectors

| Color | Minimum Deflection Freq. (Mhz) | Maximum Deflection Freq. (Mhz) |
|---|---|---|
| Red | 54.92 | 91.54 |
| Green | 65.55 | 109.25 |
| Blue | 75.00 | 125.00 |

The outputs Xc and Yc of EEProms 52 and 56 are control signals that are transformed into deflector control signals X and Y, respectively, and re-timed by memory out register 49 to drive X-DFS $69_A$ and Y-$DFS_B$. Buffers 57 and 59 provide suitable signal conditioning to transform control signals X and Y into deflection control signals Xo and Yo. Control signals $X_0$ and $Y_0$ are used to drive X- and Y-digital frequency synthesizers (DFS) 69A and 69B, respectively. The output signals $X_{RF}$ and $Y_{RF}$ of DFSs $69_A$ and $69_B$ drive X- and Y-deflectors 28 and 26, respectively, so that each of colored light signals 23F may be directed to the appropriate coordinates. DFS 69A for the X-channel deflection may be implemented as a GEC Plessey Semiconductor Model SP2001 direct digital frequency synthesizer chip. DFS $69_B$ for the Y-channel deflection may be implemented as a GEC Plessey Semiconductor Model SP2002 direct digital frequency synthesizer chip.

Deflector driver look-up table data is initially loaded into EEProms 52 and 56 via data provided as signals $X_b$ and $Y_b$, shown in FIG. 2. The most significant bits (MSBs) for determining address locations in EEProms 52 and 56 are provided by index counter 44 and are throughput to the EEProms via 2:1 multiplexer 48. By way of example, EEProms 52 and 56 may include eight 4K×12 EEPROM sub-blocks. The MSBs determine which one of the eight 4K×12 EEPROM sub-blocks is to be loaded. By way of example, parameter register 40 was implemented as a Texas Instruments 74ALS174 flip-flop integrated circuit. Signal Sel_Index_Rotation, generated by parameter register 40, controls the switching function of multiplexer 48. When signal Sel_Index_Rotation is a logical low, multiplexer 48 throughputs deflector driver information as signals Ch_Sel_LSB, Ch_Sel_2LSB, and Ch_Sel_MSB, as signals LSB, 2LSB and MSB, respectively, of multiplexer 48. However, when Sel_Index_Rotation is a logical one, then multiplexer 48 provides five addresses 0–4 comprised of signals LSB, 2LSB, and MSB in a repetitive sequence to EEProms 52 and 56. Signals LSB, 2LSB, and MSB provided by channel index counter 44 to EEProms 52 and 56 are addresses that map incoming $X_b$ and $Y_b$ data to particular X- and Y-control signal data.

Figure 3:
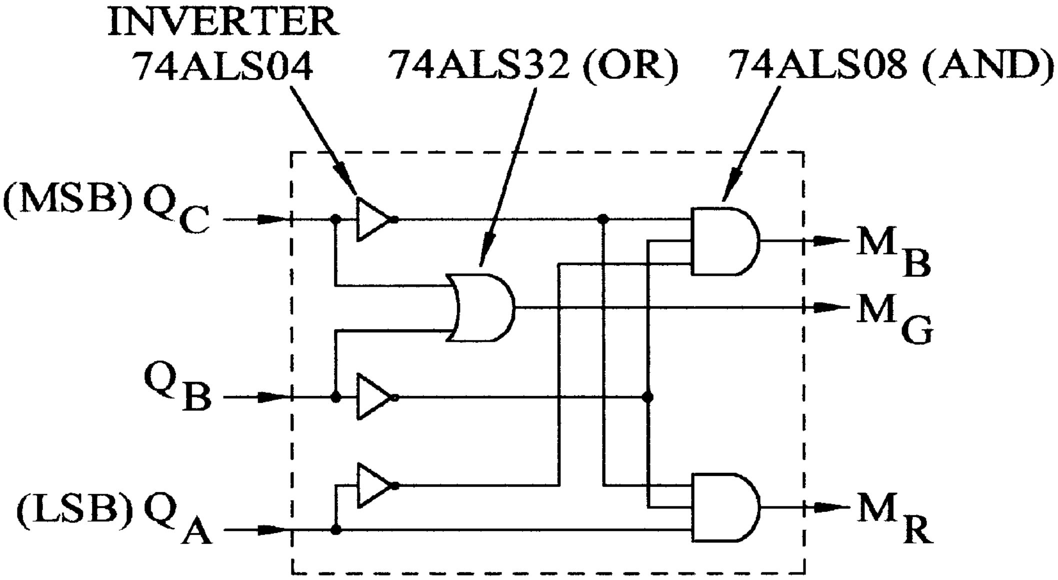
FIG. 3 is a circuit diagram showing the modulator selection logic device of FIG. 2.

Index register 60 may be implemented as a D-type flip-flop that in response to receiving a delay clock signal, DLY_CLKB from controller 18, throughputs signals LSB, 2LSB and MSB to modulator selection logic device 64, as signals $Q_AQ_B$, and $Q_C$, respectively. The presentation of signals $Q_A$, $Q_B$, and $Q_C$ to modulator selection logic device 64 is generally synchronous with the presentation of delay clock signal DLY_CLKB generated by controller 18, to the D input of index register 60. Modulator selection device 64 outputs logic signals $M_r$, $M_g$, and $M_b$ to red modulator control circuit 82, green modulator control circuit 80, and blue modulator control circuit 84, respectively. Logic signals $M_r$, $M_g$, and $M_b$ comprise control signals 31, 33, and 35, respectively. Signals 31, 33, and 35 control the red, green, and blue optical modulators 25, 27, and 29, respectively, so that red, green, and blue light signals 13, 15B, and 17B are pulsed "on," one-at-a-time, in a predetermined sequence. A circuit diagram of modulator selection device 64 is shown, by way of example, in FIG. 3. TABLE 2 below is a logic table that relates the index count, $Q_A$, $Q_B$, $Q_C$, $M_r$, $M_g$, and $M_b$ to the color of the light signal emitted from system 10.

TABLE 2

Modulator Selection Table

| Count | Color | Msb $Q_C$ | $Q_B$ | Lsb $Q_A$ | $M_b$ | $M_g$ | $M_r$ |
|---|---|---|---|---|---|---|---|
| 0 | blue | 0 | 0 | 0 | 1 | 0 | 0 |
| 1 | green | 0 | 0 | 1 | 0 | 1 | 0 |
| 2 | red | 0 | 1 | 0 | 0 | 0 | 1 |
| 3 | red | 0 | 1 | 1 | 0 | 0 | 1 |
| 4 | red | 1 | 0 | 0 | 0 | 0 | 1 |

Still referring to FIG. 2, one-shot device 68 outputs a logic low signal $\overline{Q}$ in response to receiving the DLY_CLKB signal from controller 18. However, one-shot device 68 is adjusted to provide a low signal at $\overline{Q}$ equal to the time delay τ when device 68 receives the rising edge of DLY_CLKB signal. When either the signal at $\overline{Q}$ or signal at FW is a logic high, OR gate output signal 72 is a logic high. Thus, the $\overline{\text{Blanking}}$ signal is a logic one, whereupon the selected modulator does not blank the corresponding light signal. However, when $\overline{\text{Blanking}}$ is a logic low, then the corresponding light signal is blanked. Signal $I_{bxx}$ is a logic signal generated by computer 11 that is clocked into the memory out register 49, buffered by buffer 61, and then transformed into signal $I_0$xx. Signal $Io_{xx}$ is used in conjunction with signals $M_b$, $M_g$, and $M_r$, FW, and the $\overline{\text{Blanking}}$ signal to control circuits 82, 80, and 84 so that red modulator 25 generates a signal 41 that causes red light source 12 to modulate and blank red optical signal 13, and so that green modulator 27 and blue modulator 29 intensity modulate and blank green and blue light signals 15A, and 17A to transform them into pulsed green and blue optical signals 15B and 17B, respectively. Blanking signals 31, 33, and 35 establishes the pulse pattern of optical signals 13, 15B, and 17B, respectively. Signal $FW_b$ (also referenced as signal "FW") is a logic signal generated by computer 11 that is transformed into signal FW by memory out register 49. Signal FW is amplified and transformed by buffer 63 into signal $FW_0$. Memory out register 49 re-times signals $X_c$, $Y_c$, $I_b$, and $FW_b$. Signal $FW_0$ controls the duration of light signals 13, 15B, and 17B. For example, when $FW_0$ is set to a logic one, the full pixel period of the light signal being emitted from system 10 is active. In other words, no blanking (τ) is deducted from the pixel period. However, blanking occurs for an initial time delay τ that precedes each optical signal pulse when $FW_0$ is set to 0.

Figures 5, 5A:
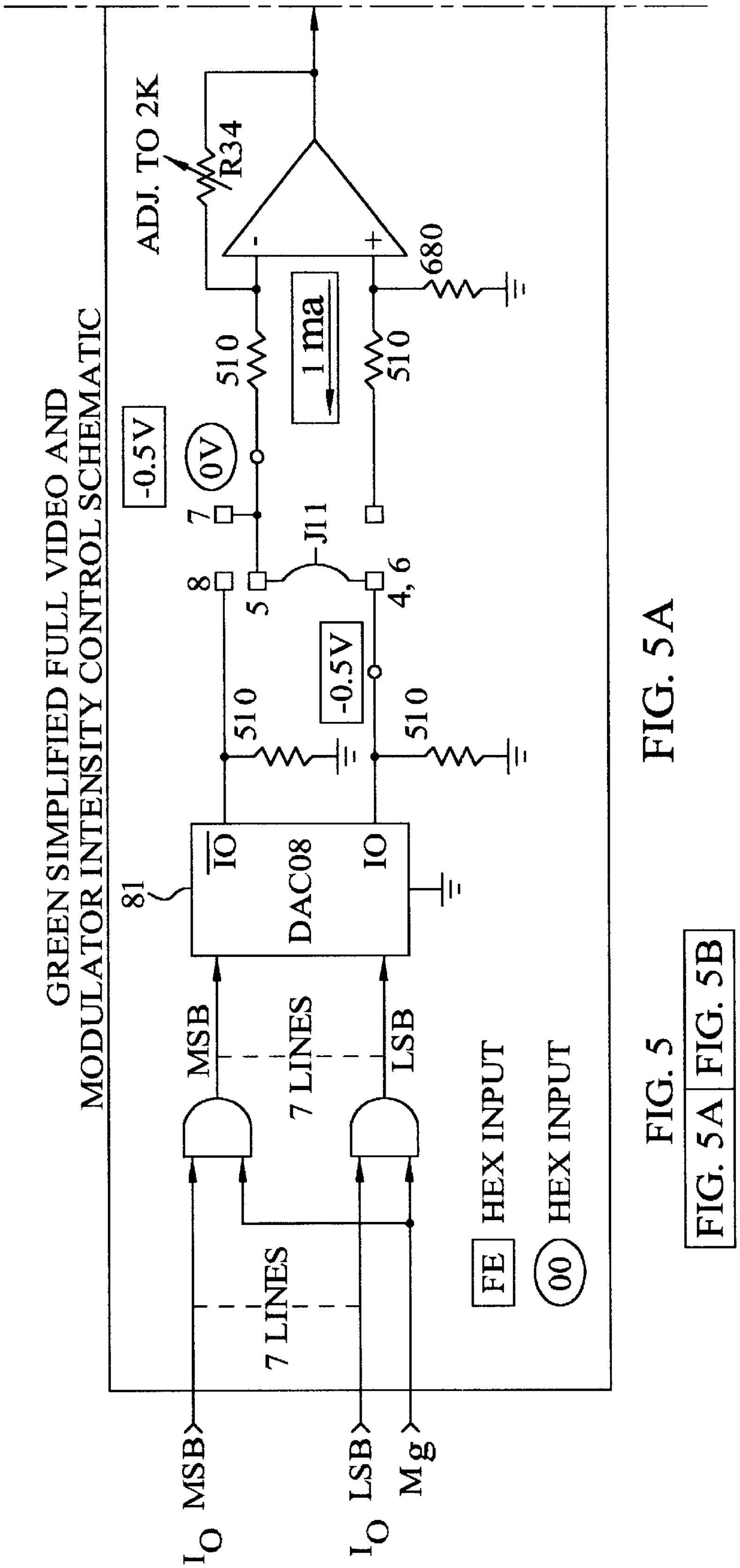
FIG. 5 is an example of a circuit for controlling the acousto-optic modulator that modulates the green light signal.
Figure 5B:
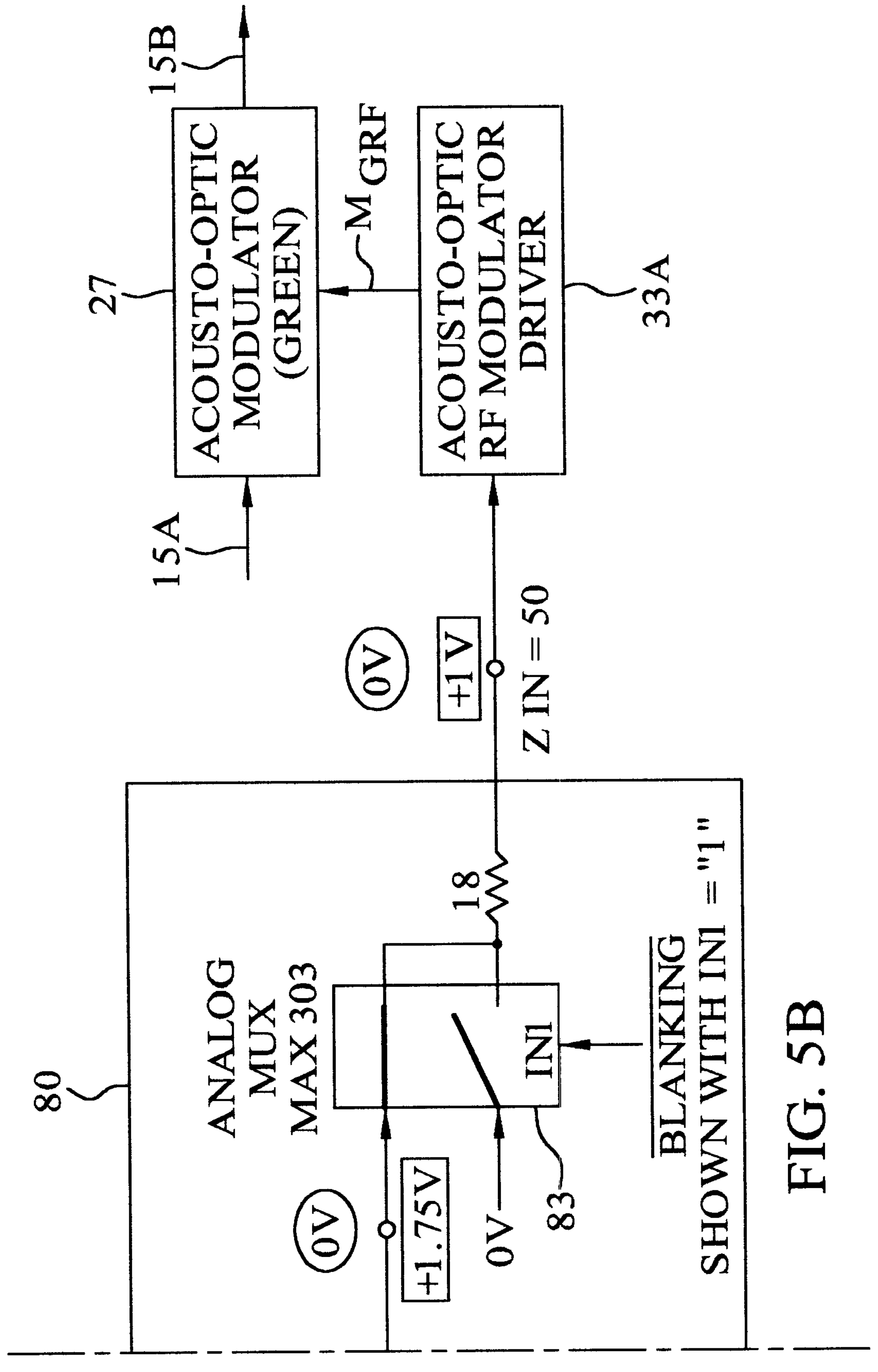

Referring now to FIG. 5, there is shown an exemplary circuit 80 for controlling acousto-optic modulator 27, and therefore intensity modulate and/or blank green light signal 15A, which is thereby transformed in pulsed green light signal 15B. When logic signal $I_{0xx}$ and logic signal Mg are presented to control circuit 80, digital to analog converter (DAC) 81, transforms signal $I_{0xx}$ into an analog signal that modulates the intensity of green light signal 15A. However, if either of signals Mg and $I_{0xx}$ are not present, then acousto-optic modulator 27 blanks green optical signal 15. The term "blanking" means that an optical signal is either completely absorbed, occluded, or not generated. If $\overline{\text{Blanking}}$ is presented to analog MUX 83 as a logic low, then acousto-optic modulator 27 blanks green light signal 15.

Figures 6, 6A:
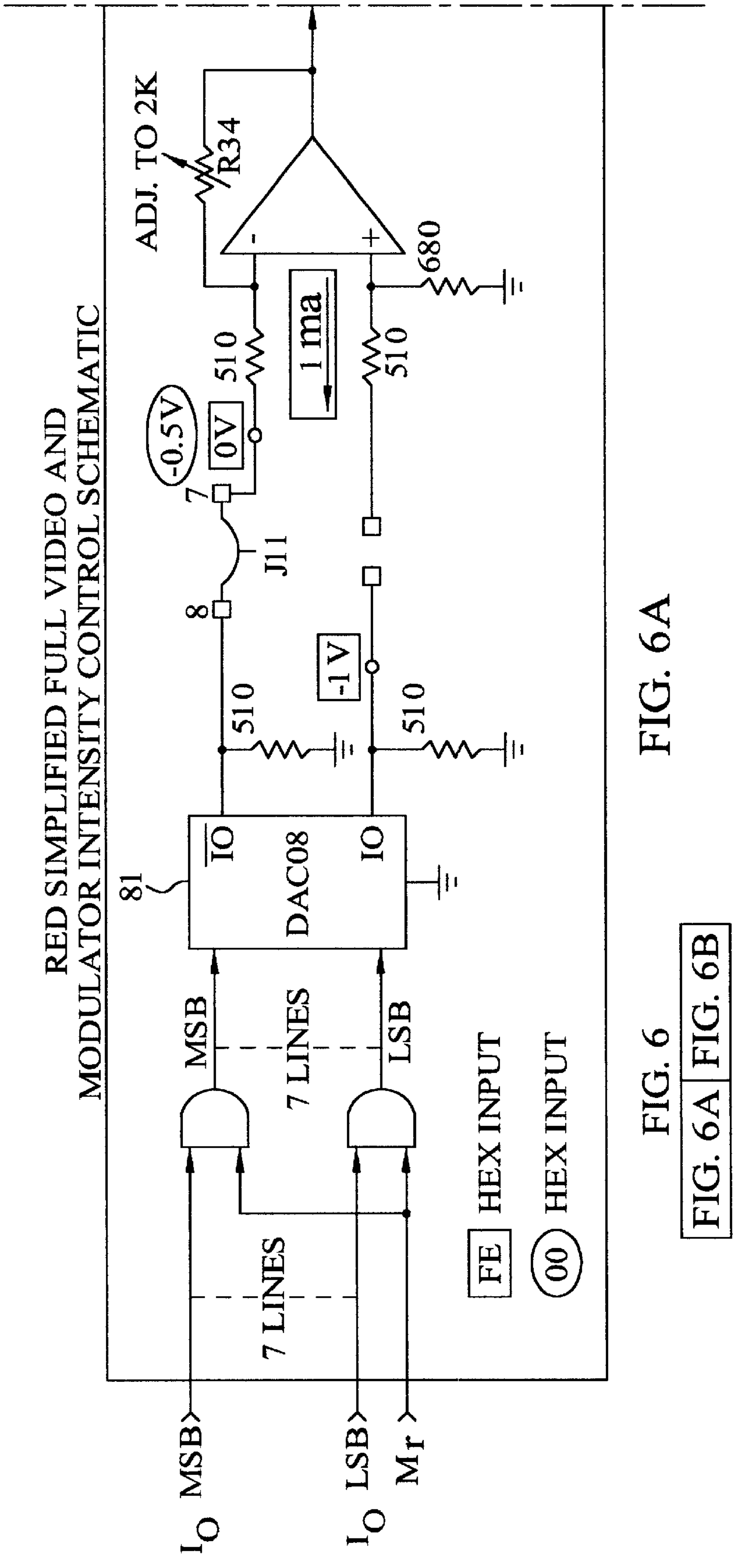
FIG. 6 is an example of a circuit for controlling the diode laser driver that modulates the red light signal.
Figure 6B:
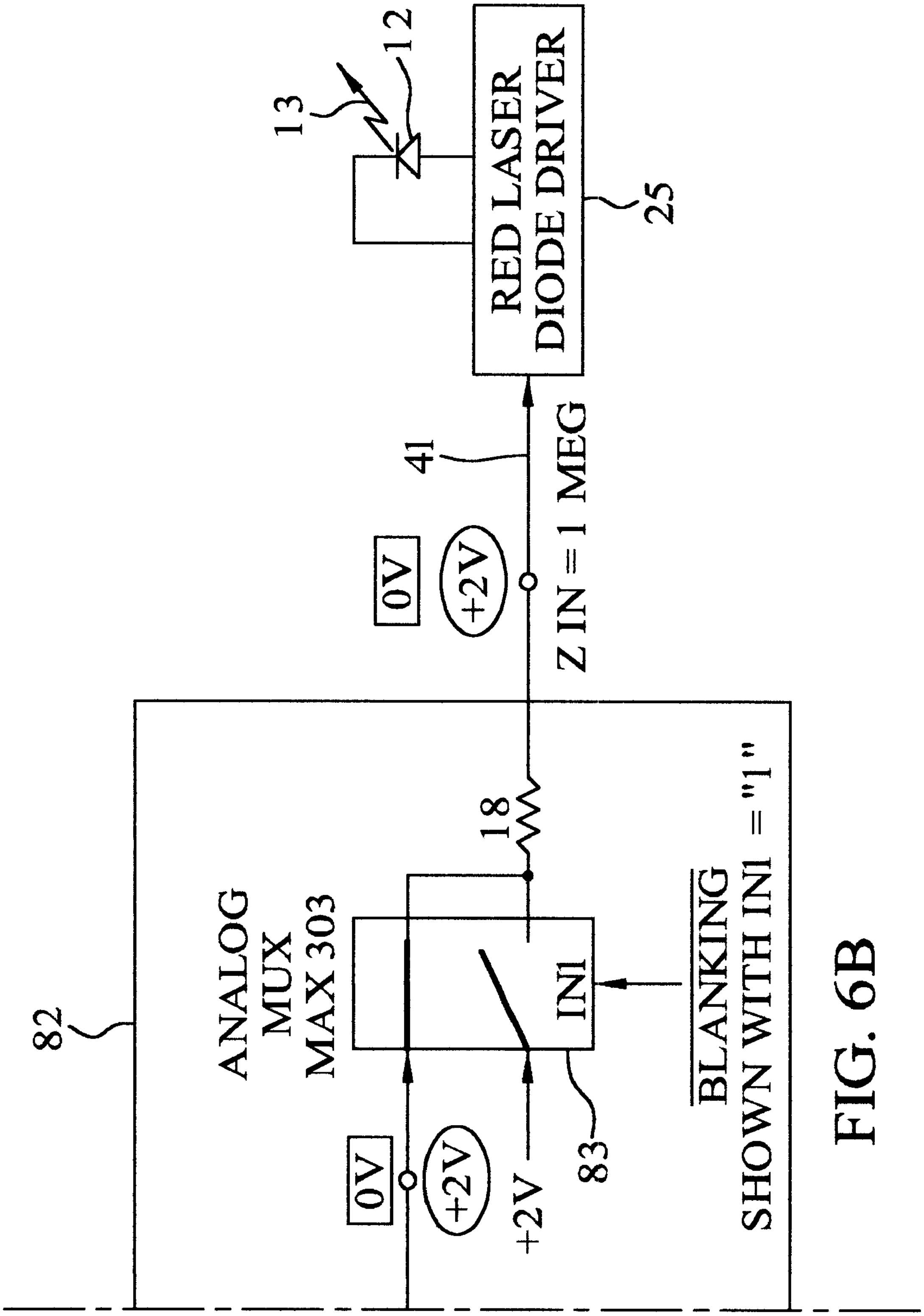

FIG. 6 shows an exemplary circuit 82 for controlling red light source modulator 25. When signal $I_{0xx}$ and logic signal Mr are presented to circuit 82, digital to analog converter (DAC) 81 of circuit 82, transforms signal $I_{0xx}$ into an analog signal that modulates the intensity of red light signal 13. However, if Blanking is presented to analog MUX 83 of circuit 82 as a logic low, then regardless of the values of signals $I_{0xx}$ and Mr, red light source modulator 25 blanks red light source 12, which is preferably implemented as a red laser diode.

Figures 7, 7A:
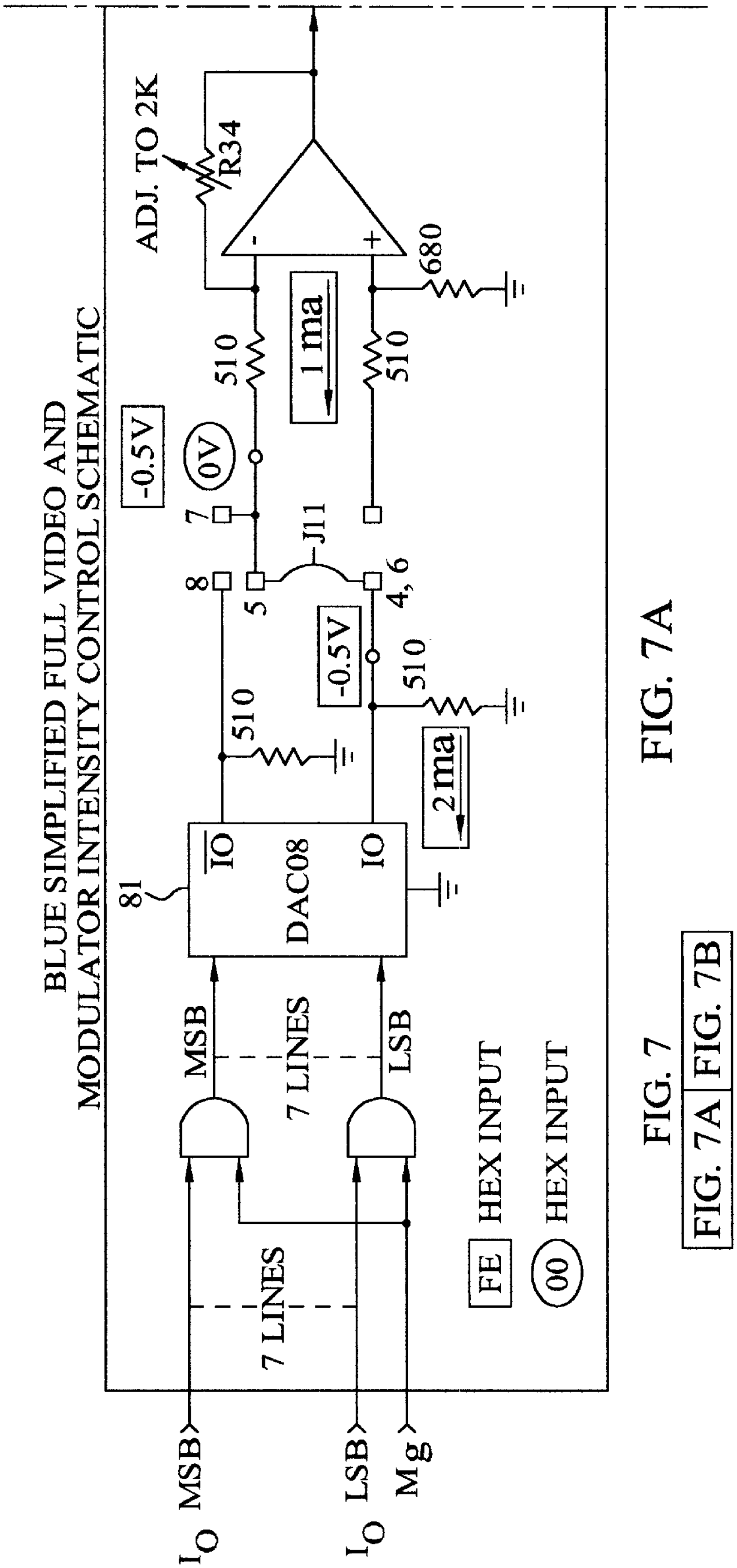
FIG. 7 is an example of a circuit for controlling the acousto-optic modulator that modulates the blue light signal.
Figure 7B:
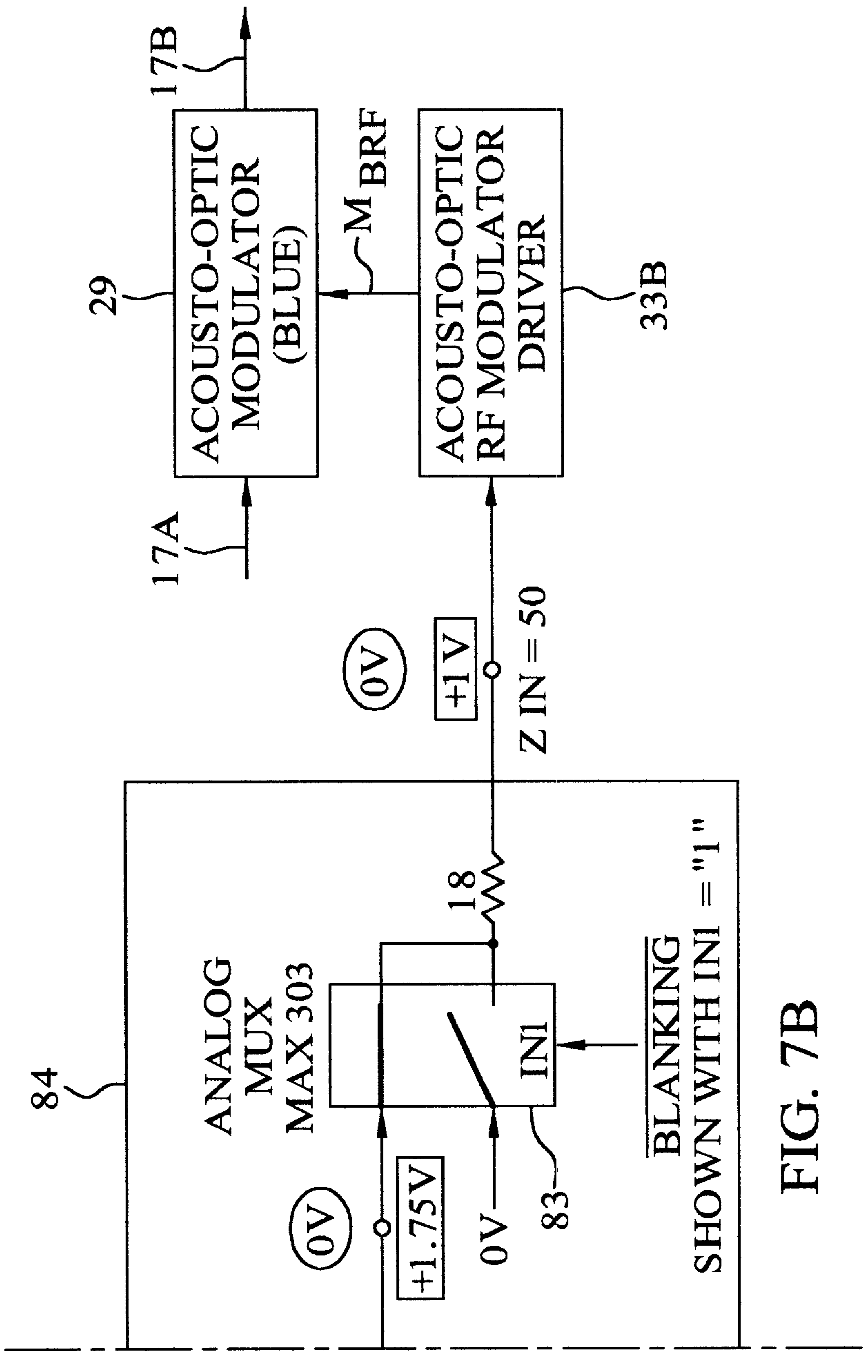

Referring now to FIG. 7, there is shown an exemplary circuit 84 for controlling acousto-optic modulator 29, and therefore intensity modulating or blanking blue light signal 17A, which is thereby transformed in pulsed blue light signal 17B. When logic signals $I_{0xx}$ and logic signal Mb are presented to digital to analog converter (DAC) 81, DAC 81 transforms signals $I_{0xx}$ into an analog signal that modulates the intensity of blue light signal 17A. If $\overline{\text{Blanking}}$ is presented to analog MUX 83 as a logic low, then acousto-optic modulator 29 blanks blue light signal 17A regardless of the values of signals $I_{0xx}$ and $M_b$.

Figure 8:
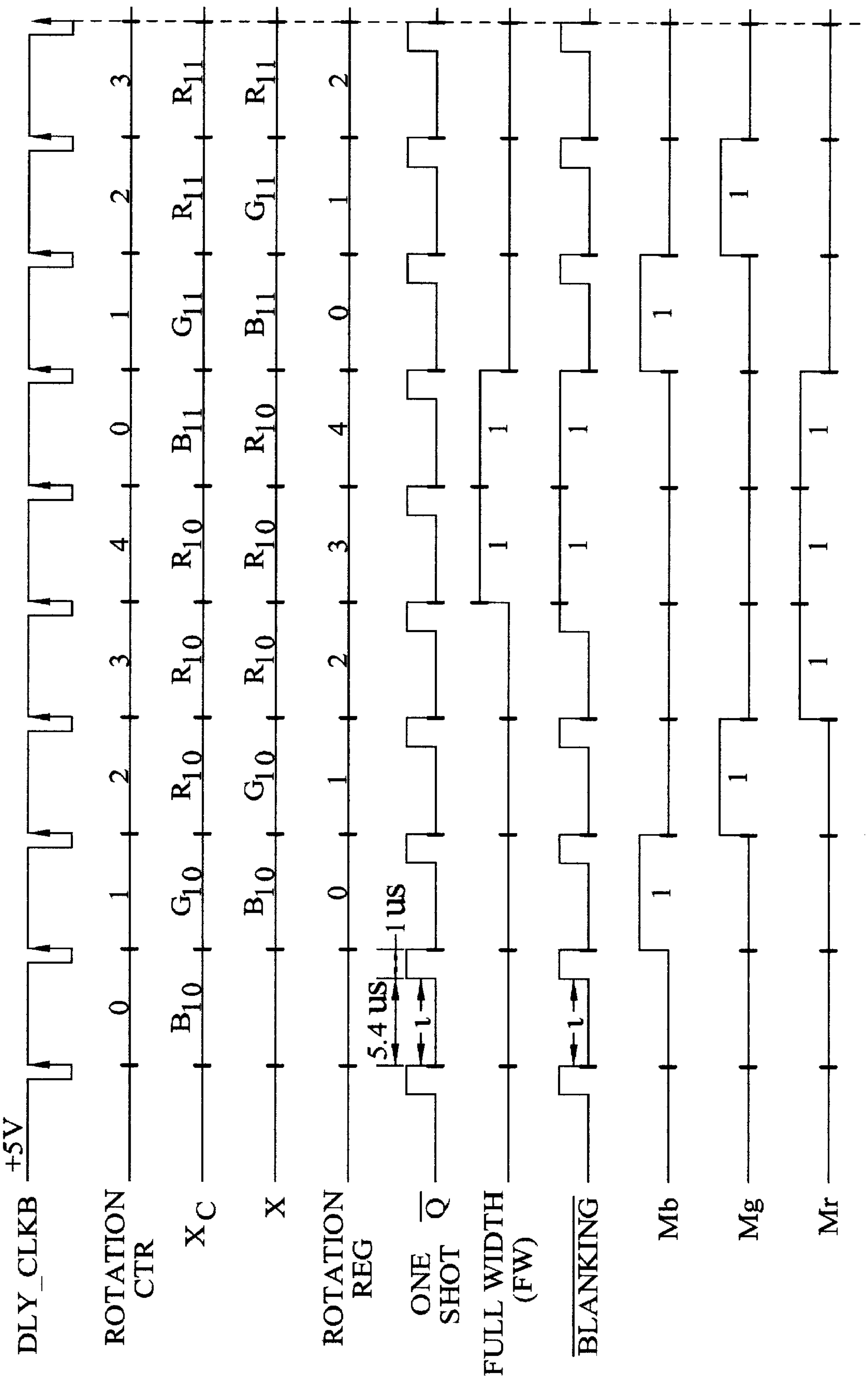
FIG. 8 is a timing diagram of the various signals shown in FIG. 2.

FIG. 8 is a timing diagram showing the timing of the various signals described herein above. One shot signal $\overline{Q}$ has a logic low interval $\tau_1$, which may be 5.4 μs. In the preferred embodiment one shot signal $\overline{Q}$ may have a period of about 6.4 μs including a pulse width of about 1 μs. Interval $\Gamma_1$ is set by design to approximate the fill time $\tau_2$ of the acousto-optic deflectors 26 and 28 so that, $\tau_1 \approx \Gamma_2$, where $\Gamma_2 = dV_A$ and d represents the diameter of the light signal that is to be deflected by either of deflectors 26 and 28, and $V_A$ represents the speed of sound in the crystal that comprises the deflectors. From FIG. 8, it may be seen that one shot signal $\overline{Q}$ becomes a logic low on a rising edge of the clock pulse signal DLY_CLKB. Signal $\overline{\text{Blanking}}$ has a waveform that generally corresponds to the waveform of signal $\overline{Q}$. However, when the value of logic signal FW (full width) becomes a logic high, then $\overline{\text{Blanking}}$ remains at a logic high while the FW logic signal remains at a logic HI. Thus, it may be appreciated that the red signal 13 (Refer to FIG. 1) may have a pulse width that is generally equal to three periods of clock signal DLY_CLKB less τ (3×6.4 μs–5.4 μs=13.8 μs), where the clock signal has a period P. Green signal 15B and blue signal 17B each have a pulse width of one clock period less τ (6.4 μs–5.4 μs=1 μs). In this way, as far as a human observer would notice, system 10 provides pulsed red signal 13 with a brightness that appears to be about as bright as green signal 15B and blue signal 17B. By way of example, blanking occurs when $\overline{\text{Blanking}}$ is at a logic low.

Referring again to FIG. 2, the values of Xc and Yc are provided by EEProms 56 and 58, respectively, to memory out register 49, which then outputs corresponding, re-timed values of Xc as X and Yc as Y in synchronicity with clock signal DLY_CLKB. However, FIG. 8 shows that signals X and Y are delayed by one clock period. In general, memory out register 49 is used to re-time all values presented to it. FIG. 8 also shows that the count, Rotation Ctr, of index counter 44 goes from 0-1-2-3-4 in a repeating cycle.

In the preferred embodiment, index counter 44 is a divide by 5 counter that repeatedly counts from a first integer value A, such as 0, to a second integer value B, such as 4. By way of example, as shown in a graph of the Rotation Ctr signal shown in FIG. 8, index counter 44 is a divide by 5 counter that counts from 0 to 4 to provide a count C, of 5, where C represents a positive integer. In the preferred embodiment, red, green, and blue optical signals 13, 15B, and 17B may each have on "on time" equivalent to (3P-τ), (P-τ), and (P-τ), respectively. More generally in other embodiments of the invention,(wP-τ) represents the time that red light signal 13 is "on," (yP-τ) represents the number of clock pulses that green light signal 15A is "on," and (zP-τ) represents the number of clock pulses that blue light signal 17A is "on," where x, y, and z represent positive integers.

Obviously, many modifications and variations of the present invention are possible in light of the above teachings. For example, the invention may be implemented using gas, solid state, diode lasers, or any other light source capable of generating narrow beams having the appropriate primary color. It is therefore to be understood that within the scope of the appended claims, the invention may be practiced otherwise than as specifically described.

We claim:

1. An optical scanner system, comprising:

optical signal generating system for generating a repeating sequence of red, green, and blue optical pulses along a common axis, where a time delay τ is interposed between each of said red, green, and blue optical pulses;

a first optical deflector for deflecting said optical pulses in a first plane;

a second optical deflector for deflecting said optical pulses in a second plane;

a controller for directing said first and second optical deflectors to deflect said optical pulses to predetermined coordinates in response to receiving coordinate data; and a computer for providing said coordinate data to said controller.

2. The system of claim 1 wherein said controller includes a memory structure that stores color corrected coordinate factors for causing said first and second optical deflectors to deflect said red, green, and blue optical pulses to said predetermined coordinates.

3. The system of claim 1 further including a beam expander for increasing the cross-sectional areas of said optical pulses.

4. The system of claim 1 wherein said optical signal generating system includes:

an optical signal generator for generating a red optical signal along said optical axis;

a second optical signal generator for generating a green signal;

a third optical signal generator for generating a blue optical signal;

a first partially reflective mirror for directing said green optical signal along said optical axis; and a second partially reflective mirror for directing said blue optical signal along said optical axis.

5. The system of claim 4 wherein said second plane is orthogonal to said first plane.

6. The system of claim 5 wherein said optical signal generating system further includes:

a first modulator for modulating the intensity of said red optical signal;

a second modulator for modulating the intensity of said green optical signal; and a third modulator for modulating the intensity of said blue optical signal.

7. The system of claim 5 wherein:

said computer generates coordinate data; and said controller generates deflection control signals in response to receiving said coordinate data that causes said first and second optical deflectors for deflecting said optical pulse sequence to predetermined coordinates.

8. The system of claim 1 wherein:

said first optical signal generator is a laser diode that generates a red laser beam;

said second optical generator is a first laser that generates a green laser beam; and said third optical signal generator is a second laser that generates a blue laser beam.

9. The system of claim 1 wherein said controller generates a clock signal having a periodicity P, and said red pulse has a duration of (wP-τ), said green pulse has a duration of (yP-τ), and said blue pulse has a duration of (zP-τ), where w, y, and z are positive integers.

10. The system of claim 1 wherein said optical pulses are separated by a time delay.

11. An optical scanning system, comprising:

a first optical signal generator for generating a first optical signal characterized by a first primary color along an optical axis;

a second optical signal generator for generating a second optical signal characterized by a second primary color;

a third optical signal generator for generating a third optical signal characterized by a third primary color;

a first beam combiner for directing said second optical signal along said optical axis;

a second beam combiner for directing said third optical signal along said optical axis;

a first optical deflector for deflecting said first, second, and third optical signals in a first plane;

a second optical deflector for deflecting said first, second, and third optical signals in a second plane that is orthogonal to said first plane;

a first modulator for modulating the intensity of said first optical signal;

a second modulator for modulating the intensity of said second optical signal;

a third modulator for modulating the intensity of said third optical signal;

a controller for controlling said first, second, and third modulators that transform said first, second, and third optical signals into a repeating sequence of red, green, and blue optical pulses separated by a time delay τ, and for causing said first and second deflectors to deflect said optical pulse sequence to predetermined coordinates.

12. The system of claim 11 wherein said first, second, and third optical signal generators each generate a laser beam.

13. The system of claim 11 wherein said controller generates a clock signal having a periodicity P, and wherein said repeating sequence includes a first pulse of said first optical signal having a duration of (wP-τ), a second pulse of said second optical signal having a duration of (yP-τ), and a third pulse of said third optical signal having a duration of (zP-τ), where w, y, and z are positive integers.

14. The system of claim 11 wherein said first optical signal is red, said second optical signal is green, and said third optical signal is blue.

15. The system of claim 11 wherein said first optical signal is a red laser beam.

16. The system of claim 11 wherein said second optical signal is a green laser beam.

17. The system of claim 11 wherein said third optical signal is a blue laser beam.

18. The system of claim 11 further including:

a computer for generating coordinate data; and said controller generates deflection control signals in response to receiving said coordinate data whereupon said deflection control signals cause said first and second optical deflectors to deflect said first, second, and third optical signals to said predetermined coordinates.

19. The system of claim 11 wherein said controller includes memory devices that store color corrected coordinate factors that are used to cause said first and second optical deflectors to deflect said red, green, and blue optical pulses to said predetermined coordinates.

20. The system of claim 11 further including a beam expander for increasing the cross-sectional areas of said red, green, and blue optical pulses.

21. The system of claim 11 further including a lens for focusing said red, green, and blue optical pulses.

* * * * *